July 23, 1957  W. D. NAGLE ET AL  2,799,940
GAGE FOR MEASURING DEPTH OF SCRATCHES AND ABRASIONS
Filed Sept. 8, 1953
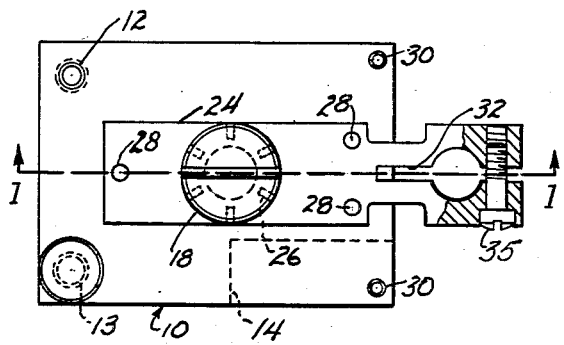
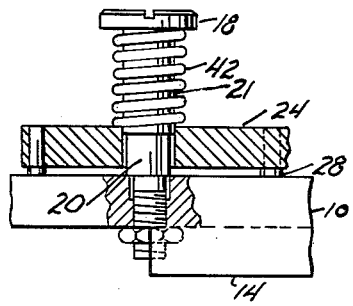
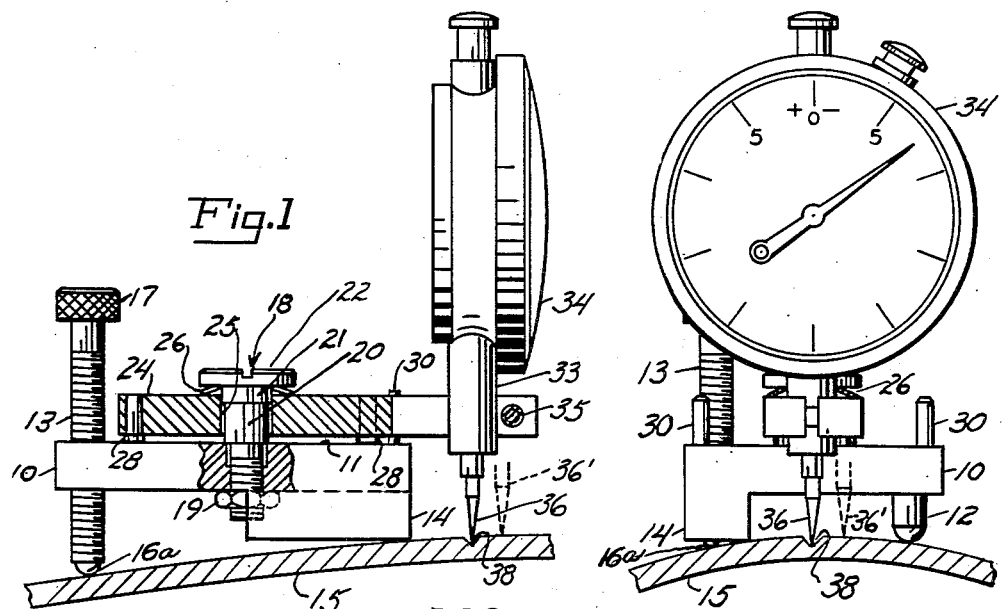
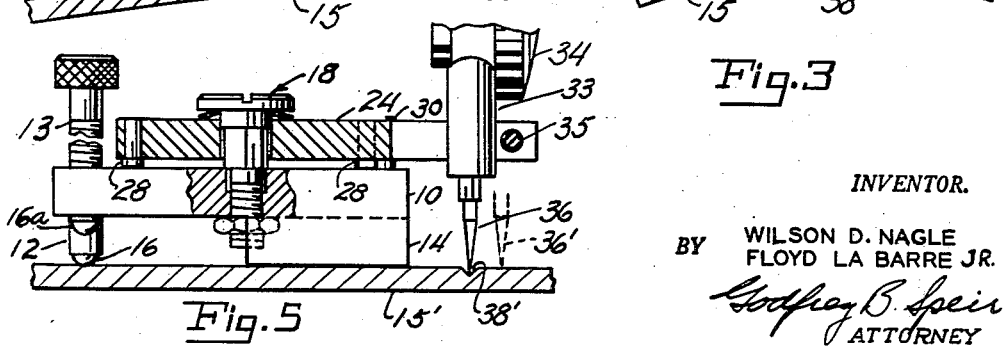
INVENTOR.
WILSON D. NAGLE
BY FLOYD LA BARRE JR.
ATTORNEY United States Patent Office 2,799,940
Patented July 23, 1957

2,799,940

GAGE FOR MEASURING DEPTH OF SCRATCHES AND ABRASIONS

Wilson D. Nagle, Fair Lawn, and Floyd La Barre, Jr., Denville, N. J., assignors to Curtiss-Wright Corporation, a corporation of Delaware Application September 8, 1953, Serial No. 378,754

8 Claims. (Cl. 33—172)

This invention relates to gaging tools and is particularly concerned with a gage arrangement for determining the depth of scratches, nicks and the like in the surface of an article.

While the gaging assembly of this invention has general utility, it is particularly applicable for determining the depth of nicks, scratches and surface defects on curved or compound-curved surfaces such as those found on aeronautical propeller blades. Metal propeller blades as used in aircraft are exposed in use to flying foreign matter and particularly when an aircraft lands, pebbles, gravel and the like may be thrown up by the landing gear into the path of the propeller blades whereby the blades are scratched or scored. To retain the best aerodynamic efficiency of propeller blades they must have smooth, polished surfaces so that if the blades are scratched, it becomes desirable to work out these scratches by filing and by the use of abrasive cloths, the blade surface being polished after the nicks or scratches have been erased. Particularly in hollow steel propeller blades, the thickness of the plates comprising the blades is an important factor in retaining adequate strength in the blade for normal service use. In the design of blades, limits are established for scratches, nicks, etc. so that if they are less than a certain depth, the blade may be dressed and polished to erase the flaws, but if they are greater than a certain depth, the erasure of the flaws would adversely affect the strength of the blade so the blade must be scrapped or reworked under factory conditions to render it serviceable for further use.

The erasure and polishing of nicks and scratches is normally a field service operation and inspection of the blades for nicks and scratches is done frequently. With the above indicated limitation on depth of flaws, it is virtually essential to have a portable and convenient gage arrangement by which an inspector can accurately establish the depth of a flaw, after which he decides whether field rework may be accomplished or whether the blade must be removed from service.

It is an object of the present invention to provide a gage arrangement having great flexibility in use which can be used for determining, accurately, the depth of nicks, flaws or scratches in the surfaces of propeller blades or other articles. A further object of the invention is to provide a gage arrangement which may be used effectively on nearly any sort of curved surface, the gage assembly including arrangements for establishing an unmarred surface datum, and then in measuring the depth of the flaw with respect to said datum. A further object of the invention is to provide adjustments in the gage whereby it can be readily adapted for use with either flat or curved surfaces.

Further objects of the invention will become apparent in reading the following detailed description in connection with the drawings, in which similar reference characters indicate similar parts, and in which Fig. 1 is a side elevation of the gage, partly in section, as used on a curved surface, Fig. 2 is a plan of the gage, partly in section, Fig. 3 is an end elevation of the gage as applied to a curved surface.

Fig. 4 is a fragmentary side elevation of a portion of the gage, modified in form, and Fig. 5 is a fragmentary elevation, similar to Fig. 1, showing the gage in use on a flat edge surface.

The gage of the invention comprises a flat platform 10 of durable metal and which may be of approximately the relative size shown in the drawings. The top surface 11 of the platform 10 is ground flat. The platform is provided with three legs 12, 13 and 14 depending therefrom to provide a tripod, the platform through the three legs 12, 13 and 14 being manually held in against a workpiece 15. The leg 12 is fixed and preferably has a rounded lower end 16. The leg 13 comprises an adjustable screw having a knurled head 17 and a rounded lower end 16a. The leg 14 preferably comprises a rectangular block which is formed in this fashion for a purpose which will be explained. Centrally in the latform 10 is a hole to accommodate a journal member 18, the lower end of which threadedly engages the platform and is locked thereto by a nut 19. The upper portion of the journal member 18 comprises a relieved part 20 and a journal part 21, while the upper part of the journal member 18 comprises a head 22. The journal member 18 serves to secure a swingable gage arm 24 to the platform 10, the gage arm having a central hole 25 which has a fairly close running fit with the journal portion 21 of the member 18. Between the head 22 and the gage arm 24 upper surface, a belleville spring washer 26 is disposed so that when the member 18 is secured properly in the platform 10 the gage arm 24 is spring pressed toward the platform 10. The gage arm is provided with three buttons 28 which bear on the platform surface, the three buttons providing a secondary tripod to stabilize the arm 24 relative to the platform. The journal portion 21 of the member 18 engages only a small part of the arm 24, dependence being placed upon the buttons 28 to hold the arm in coplanar relation with the platform. The arm 24 may be swung about the journal member 18 from side to side, to limits established by stop pins 30 secured in the platform.

The outer end of the arm 24 is slitted as at 32 and is drilled to receive the fixed stem 33 of a dial indicator 34, the indicator being secured to the arm 24 by a clamp screw 35.

The bottom movable spindle 36 of the dial indicator 34 is formed as a slender pointed needle. Also the dial indicator is of a type wherein the needle 36 is spring urged in an upward direction as shown.

When the gage is used the platform is located relative to a flaw 38, and the leg 13 is adjusted so that the platform lies substantially parallel to a plane tangent to the article 15 at the flaw 38, with all the tripod legs 12, 13 and 14 engaged with the surface of the article 15, as shown in Figs. 1 and 3. The indicator needle 36 is then pressed downwardly to engage the bottom of the flaw or scratch 38 in the article 15. A reading is taken on the dial indicator. Then, while holding the gage firmly in engagement with the article 15, the needle 36 is relaxed and the arm 24 is swung a few degrees on the journal member 18 relative to the platform, so that the axis of the needle intersects the surface of the article at a point slightly removed from the scratch 38, but opposite an unmarred surface of the article. The needle 36 is engaged with the surface of the article 15 and a second indicator reading is taken. The difference in the indicator readings will indicate the depth of the scratch 38.

As shown in Figs. 1 and 3, the tripod legs 12, 13 and 14, are engaged with a compound-curved article surface and the adjustable leg 13 may be extended or retracted as desired to secure a convenient disposition of the gage needle relative to the article and to adjust the platform to parallelism with the article 15 in the zone of the flaw. The dotted lines 36' show the needle in position to take a reference reading on the surface of the article with respect to which the flaw depth reading is compared.

Fig. 4 shows essentially the same gage assembly except that the belleville washer 26 is replaced by a helical spring 42. Since helical springs have a considerably lower rate than belleville springs, the adjustment of the spring is less critical and greater tolerance is permitted in the manufacture of the journal member 18 and the thickness of the combined buttons 28 and gage arm 24.

In Fig. 5 the gage is shown in use on a straight line edge of the workpiece such as 15'. This is representative, for instance, of the leading edge of a propeller blade which is linear in one direction and quite sharply curved in the other direction. In this situation the rectangular block leg 14 on the platform 10 may be used in linear contact with the article 15', the other two legs 12 and 13 being out of contact with the article. The gage arm 24 is swung so that the gage needle 36 lies in line with the block leg 14. The needle is pressed into the notch 38' and a reading is taken. The needle is than allowed to move away from the article 15' and the whole gage is slid along the edge of the article 15' a short distance so that the needle 36 overlies an unmarred part of the article. Then, the needle is again brought into contact with the article to secure a reference reading. As before, the difference between the notch reading and the reference reading represents the depth of the scratch.

The foregoing description and the attached drawings show a preferred embodiment of the gage of this invention but it should be clear to those skilled in the art that many variations could be made while still subscribing to the principles of the invention. The shape of the various components could be modified, the arrangement for pivoting the gage arm 24 on the platform 10 could be accomplished in numerous ways, and the shape and disposition of the legs 12, 13 and 14, and of the buttons 28, could be modified materially while still producing an effective gage assembly.

Though a single embodiment illustrating the invention is shown, it is to be understood that the invention may be applied in various forms and in various environments. Changes may be made in the arrangement shown without departing from the spirit of the invention. Reference should be had to the appended claims for definition of the limits of the invention:

What is claimed is:

1. A gage for measuring the depth of defects in the surface of irregular objects, comprising a plane platform having three legs adapted to rest upon the object, and an arm pivoted on said platform on an axial normal to the platform surface said arm having fixed elements thereon engaging the plane surface of said platform and elastically retained in contact with said platform, said arm having a clamping device at one end thereof to hold a dial indicator with its spindle normal to the plane of said platform.

2. A gage for measuring the depth of defects in the surface of irregular objects, comprising a plane platform having three legs adapted to rest upon the object, and an arm pivoted on said platform on an axis normal to the platform surface said arm having fixed elements thereon engaging the plane surface of said platform and elastically retained in contact with said platform, said arm having a clamping device at one end thereof to hold a dial indicator with its spindle normal to the plane of said platform, said arm being swingable on its pivot to locate said dial indicator over a defect in said object while the platform legs are firmly engaged with the object surface, and said arm being swingable, with the platform legs still engaged with the object surface, to dispose said dial indicator over a portion of the object surface adjacent said defect.

3. A dial indicator holding attachment comprising a tripod having legs engageable with the surface of an object and having a plane platform, a journal extending normally from said platform, an arm borne on said journal and secured thereto for pivoting relative to said platform, means for mounting a dial indicator on said arm, with its axis of action substantially parallel to and spaced from said journal, the fit of said arm on said journal being loose, and a plurality of bearing projections on said arm engaging said plane platform.

4. A dial indicator holding attachment comprising a tripod having legs engageable with the surface of an object and having a plane platform, a journal extending normally from said platform, an arm borne on said journal and secured thereto for pivoting relative to said platform, means for mounting a dial indicator on said arm, with its axis of action substantially parallel to and spaced from said journal, the fit of said arm on said journal being loose, a plurality of bearing projections on said arm engaging said plane platform, and resilient means connecting said journal and said arm pressing said bearing projections into engagement with said plane platform.

5. A dial indicator holding attachment comprising a tripod having legs engageable with the surface of an object and having a plane platform, a journal extending normally from said platform, an arm borne on said journal and secured thereto for pivoting relative to said platform, means for mounting a dial indicator in said arm, with its axis of action substantially parallel to and spaced from said journal, the fit of said arm on said journal being loose, a plurality of bearing projections on said arm engaging said plane platform, and resilient means connecting said journal and said arm pressing said bearing projections into engagement with said plane platform, said resilient means comprising a belleville spring washer.

6. A dial indicator holding attachment comprising a tripod having legs engageable with the surface of an object and having a plane platform, a journal extending normally from said platform, an arm borne on said journal and secured thereto for pivoting relative to said platform, means for mounting a dial indicator on said arm, with its axis of action substantially parallel to and spaced from said journal, the fit of said arm on said journal being loose, a plurality of bearing projections on said arm engaging said plane platform, and resilient means connecting said journal and said arm pressing said bearing projections into engagement with said plane platform, said resilient means comprising a helical spring.

7. A dial indicator holding attachment comprising a tripod having legs engageable with the surface of an object and having a plane platform, a journal extending normally from said platform, an arm borne on said journal and secured thereto for pivoting relative to said platform, means for mounting a dial indicator in said arm, with its axis of action substantially parallel to and spaced from said journal, and resilient means connecting said journal and said arm and holding said arm in engagement with said platform.

8. A readily portable dial indicator holding attachment comprising a base member having an upper plane surface, three legs spaced apart and depending below and secured to said member, one of said legs being adjustable in a direction substantially normal to said plane surface, a journal disposed centrally of said member and extending upwardly from and normal to said plane surface, an arm piloted on said journal for rotation having an end extending beyond the margins of said base member, a plurality of fixed, spaced-apart protuberant elements secured to the lower surface of said arm and engaging said plane upper surface of said base member, means including a spring engaging said arm and journal for holding the protuberant elements of said arm in engagement with said plane surface, one of said member legs comprising a fixed block having a lower surface parallel to the plane upper surface of said member, and means on the extending end of said arm for securing a dial indicator thereto.

References Cited in the file of this patent

UNITED STATES PATENTS

| | | |
|---|---|---|
| 802,470 | Picard | Oct. 24, 1905 |
| 814,111 | Bastrom | Mar. 6, 1906 |

FOREIGN PATENTS

| | | |
|---|---|---|
| 245,756 | Switzerland | June 15, 1943 |

OTHER REFERENCES

Catalogue No. 6A Standard Gage Co., Poughkeepsie, New York. Published 1934. (Copy in Div. 66.)